UNITED STATES PATENT OFFICE.

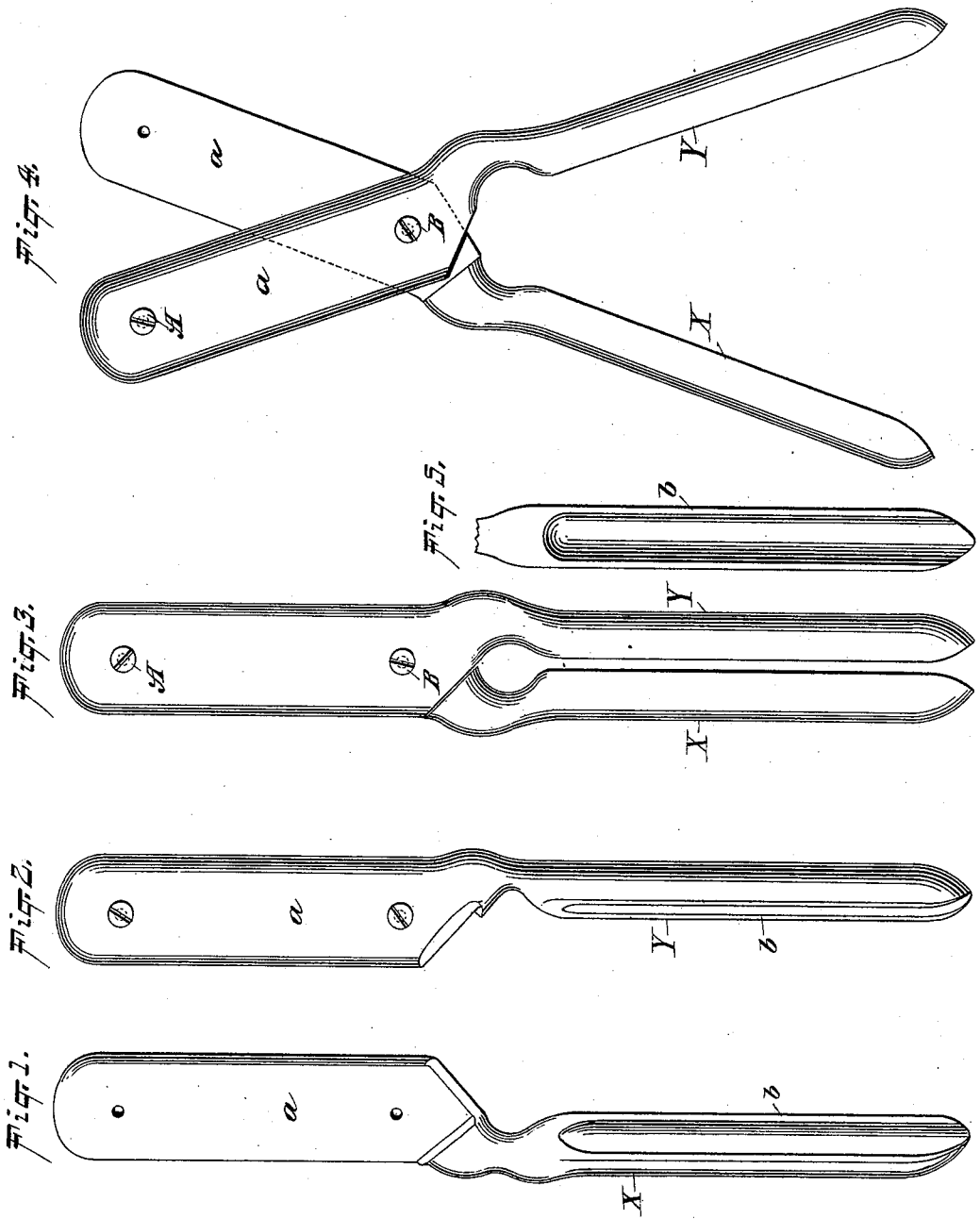

CHRISTOPHER HY. OERTLE, OF NEW YORK, N. Y.

ASPARAGUS-HOLDER.

SPECIFICATION forming part of Letters Patent No. 602,097, dated April 12, 1898.

Application filed April 25, 1896. Serial No. 589,118. (No model.)

*To all whom it may concern:*

Be it known that I, CHRISTOPHER HENRY OERTLE, a citizen of the United States of America, residing at New York, in New York county, State of New York, have invented an Asparagus-Holder; and I do hereby declare that the following is a full, clear, and exact description of the invention, which will enable others to make and use the same.

My invention relates to an improvement in asparagus-holders, the object of the same being to provide an article of this kind so constructed that all handling of the asparagus itself while eating the same and the consequent soiling of the fingers will be obviated.

A further object of my invention is to construct a holder for this purpose which will be simple in its structure and economical to manufacture, so that for a very small outlay of money a sufficient number of holders may be provided to allow a holder to be attached to each piece or stem of asparagus, the idea being to attach the holder to the asparagus before the latter is sent to the table.

With these and other ends in view my invention consists of certain novel features of construction and combinations of parts, as will be hereinafter fully described, and pointed out in the claim.

In the accompanying drawings, Figures 1 and 2 are side views of the two parts or sections of the holder. Fig. 3 is a similar view of the holder after the sections have been secured or joined together. Fig. 4 is a side view of the holder, the two parts being adjusted to receive a piece or stem of asparagus. Fig. 5 is a detail view showing the inner side or face of one of the gripping-fingers.

Referring to the drawings, X Y respectively represent the two parts or sections of the holder, formed of any desired material, but preferably of wood, each of said sections being formed at one end into a handle $a$ and at the opposite end into a gripping-finger $b$, the inner faces or sides of said handles, which come together when the holder is closed, being flat and the outer faces thereof slightly rounded, the completed handle being comparatively flat in the direction of its width.

The holding or gripping ends $b$ are preferably concavo-convex in shape to conform to the shape of the asparagus and are of sufficient length to inclose a large portion of the stem thereof, said ends when the holder is closed coming together within a short distance of each other, as shown in Fig. 3, and the ends $a$ exactly opposite each other to form practically one complete handle.

B represents a screw forming a pivot and passing from one section into the other to allow the sections to be closed or separated, a second screw A being shown near the outer end of the handle, the object of which is to enable the two sections of the holder to be securely held in their closed adjustment after the stem of asparagus has been inserted between the gripping ends $b$. It will be obvious, without further description or illustration, to those skilled in the art that other fastening means may be substituted for the screw A, the only requirement being that such will prevent the accidental separation or opening of the sections X Y after being adjusted to grip the asparagus.

It will now be understood that my invention is exceedingly simple and economical and that if a holder be applied to each stem of asparagus before the latter is placed upon the table there will be no necessity for handling the asparagus itself, and consequently the danger of soiling one's fingers (the great objection to the eating of this particular vegetable) will be overcome.

Having fully described my invention, what I claim as new, and desire to secure by Letters Patent, is—

An asparagus-holder, comprising two jaws or sections each consisting of a grooved or hollowed finger, and a handle portion recessed at its inner end and flattened at its inner side, whereby the two handle portions may be closed one upon the other and overlapped to constitute a single flat grasping end for the device, in combination with a pivot for securing the handle-sections together, and a fastening device for detachably securing the outer overlapped ends of the handle-sections together to clamp the stalk of asparagus between the hollowed fingers.

CHRIST. HY. OERTLE.

Witnesses:
SIGMUND HERZ,
MARC BUDDE.